US009222456B2

(12) United States Patent
Han

(10) Patent No.: US 9,222,456 B2
(45) Date of Patent: Dec. 29, 2015

(54) DEVICE WITH TWIN-CHAMBER STRUCTURE FOR CONVERSION OF WAVE ENERGY OF OSCILLATING WATER

(75) Inventor: Lei Han, Singapore (SG)

(73) Assignee: Hann-Ocean Energy Pte Ltd., Singapore (SG)

( * ) Notice: Subject to any disclaimer, the term of this patent is extended or adjusted under 35 U.S.C. 154(b) by 524 days.

(21) Appl. No.: 13/060,057

(22) PCT Filed: Aug. 29, 2008

(86) PCT No.: PCT/SG2008/000320
§ 371 (c)(1),
(2), (4) Date: Aug. 11, 2011

(87) PCT Pub. No.: WO2010/024780
PCT Pub. Date: Mar. 4, 2010

(65) Prior Publication Data
US 2011/0291417 A1    Dec. 1, 2011

(51) Int. Cl.
*F03B 13/12*      (2006.01)
*F03B 13/14*      (2006.01)

(52) U.S. Cl.
CPC ........... *F03B 13/145* (2013.01); *F05B 2240/40* (2013.01); *Y02E 10/28* (2013.01); *Y02E 10/38* (2013.01)

(58) Field of Classification Search
CPC ... F03B 13/145; F05B 2240/40; Y02E 10/28; Y02E 10/38
See application file for complete search history.

(56) References Cited

U.S. PATENT DOCUMENTS 1,143,118 A * 6/1915 Hoffman ............................ 415/7
1,338,326 A * 4/1920 Peck ................................. 415/7

(Continued)

FOREIGN PATENT DOCUMENTS

| GB | 1581831 | 12/1980 |
| JP | 11-117847 | 4/1999 |
| WO | 86/04391 | 1/1986 |

OTHER PUBLICATIONS

International Search Report of PCT/SG2008/000320, dated May 8, 2009 (2 pages total).

*Primary Examiner* — Tulsidas C Patel
*Assistant Examiner* — S. Mikailoff
(74) *Attorney, Agent, or Firm* — Hamre, Schumann, Mueller & Larson, P.C.

(57) ABSTRACT

A device for conversion of energy of a wave of water comprises a front (11) and a back (12) opposite the front (11), a top (13) and a bottom (14) opposite the top (13), an inlet chamber (15) which has a partition (16), an inlet valve (17) at the front (11) between the top (13) and the partition (16) and an inlet chamber vent (18), wherein the inlet valve (17) allows flow of water in one direction into the inlet chamber (15). An outlet chamber (19) has an outlet valve (20) between the partition (16) and the bottom (14), and an outlet chamber vent (21) positioned between the partition (16) and the top (13), adapted to maintain atmosperic pressure of air in the outlet chamber (19), wherein the outlet valve (20) allows flow of water in one direction out of the outlet chamber (19). A connecting duct (22) connects the partition (16) of the inlet chamber (15) to the outlet chamber (19), and a generator (41) positioned at least partially in the connecting duct (22) generates electricity in response to wave energy-induced flow of water into the inlet chamber (15).

15 Claims, 12 Drawing Sheets

(56) References Cited

U.S. PATENT DOCUMENTS

| | | | | |
|---|---|---|---|---|
| 1,504,776 | A * | 8/1924 | Nagler | 415/169.1 |
| 2,820,148 | A * | 1/1958 | Southwick | 290/4 D |
| 4,076,448 | A * | 2/1978 | Sanders, Jr. | 415/198.1 |
| 4,123,667 | A * | 10/1978 | Decker | 290/53 |
| 4,141,670 | A * | 2/1979 | Russell | 415/3.1 |
| 4,193,265 | A * | 3/1980 | Ootsu | 60/398 |
| 4,345,434 | A * | 8/1982 | Nedyalkov | 60/398 |
| 5,512,787 | A * | 4/1996 | Dederick | 290/4 R |
| 6,216,455 | B1 * | 4/2001 | Doleh et al. | 60/398 |
| 7,834,475 | B1 * | 11/2010 | Costas | 290/53 |
| 7,915,750 | B1 * | 3/2011 | Rovinsky | 290/54 |
| 8,072,088 | B2 * | 12/2011 | McMinn | 290/53 |
| 8,424,300 | B1 * | 4/2013 | Navarro | 60/398 |
| 8,525,364 | B1 * | 9/2013 | Costas et al. | 290/53 |

* cited by examiner

DEVICE WITH TWIN-CHAMBER STRUCTURE FOR CONVERSION OF WAVE ENERGY OF OSCILLATING WATER

FIELD OF THE INVENTION

The present invention relates to a device for conversion of energy of a wave of water into other forms of energy.

BACKGROUND

There is an increasing demand for energy in today's world. Increases in energy prices have led to the consideration of various alternative sources of energy. These alternative energy sources include, for example capturing part of the energy of a wave of water. Various techniques for harvesting energy from water waves are known. For example, Japanese Patent Publication JP 11-117847 to Hatakeyama discloses a power-generating device which has an inflow chamber and a discharge chamber. The front wall of the inflow chamber has a plurality of backflow-check boards placed to open inward. The front wall of the discharge chamber has a plurality of inflow-check boards placed so as to open outward. The inflow chamber adjoins the discharge chamber, separated by a partition with a communicating hole. A turbine, connected to a generator in the discharge chamber, is positioned in the communicating hole. The discharge chamber is provided with a lid.

PCT patent publication WO 86/04391 to Bleissener discloses a wave energy plant for the exploitation of wave energy, comprising a float anchored at the bottom of the sea and subdivided into an inlet chamber and a discharge chamber. Barrage elements let the stream pass in only one direction. Flow openings are formed in the wall between the inlet chamber and the discharge chamber, and a hydraulic turbine coupled to a generator is arranged in each opening. The water penetrates in the inlet chamber through the barrage elements which are in the area of the up waves of the sea. The water comes out of the discharge chamber through the barrage elements which are in the region of the trough of the waves. The pressure difference between the barrage elements opened by the water which enters and comes out, and the volume of water which flows due to said difference through the hydraulic turbines produces energy.

However such know wave energy conversion devices suffer from drawbacks in terms of efficiency in converting as much of the energy of the wave as possible, making them impractical. It would be highly desirable to provide a device for converting wave energy into electricity with increased efficiency which is also reliable, durable and cost-effective.

SUMMARY OF THE INVENTION

In accordance with a first aspect, a device for conversion of energy of a wave of water comprises a front and a back opposite the front, a top and a bottom opposite the top, an inlet chamber which has a partition, an inlet valve at the front between the top and the partition, and an inlet chamber vent, wherein the inlet valve allows flow of water in one direction into the inlet chamber. An outlet chamber has an outlet valve between the partition and the bottom, and an outlet chamber vent positioned between the partition and the top, adapted to maintain atmospheric pressure of air in the outlet chamber, wherein the outlet valve allows flow of water in one direction out of the outlet chamber. A connecting duct connects the partition of the inlet chamber to the outlet chamber, and a generator positioned at least partially in the connecting duct generates electricity in response to wave energy-induced flow of water into the inlet chamber.

From the foregoing disclosure and the following more detailed description of various preferred embodiments it will be apparent to those skilled in the art that the present invention provides a significant advance in the technology of conversion of energy of a wave of water. Particularly significant in this regard is the potential the invention affords for providing a high efficiency, low cost device for conversion of energy of a wave of water into electricity. Additional features and advantages of various preferred embodiments will be better understood in view of the detailed description provided below.

Figure 1:
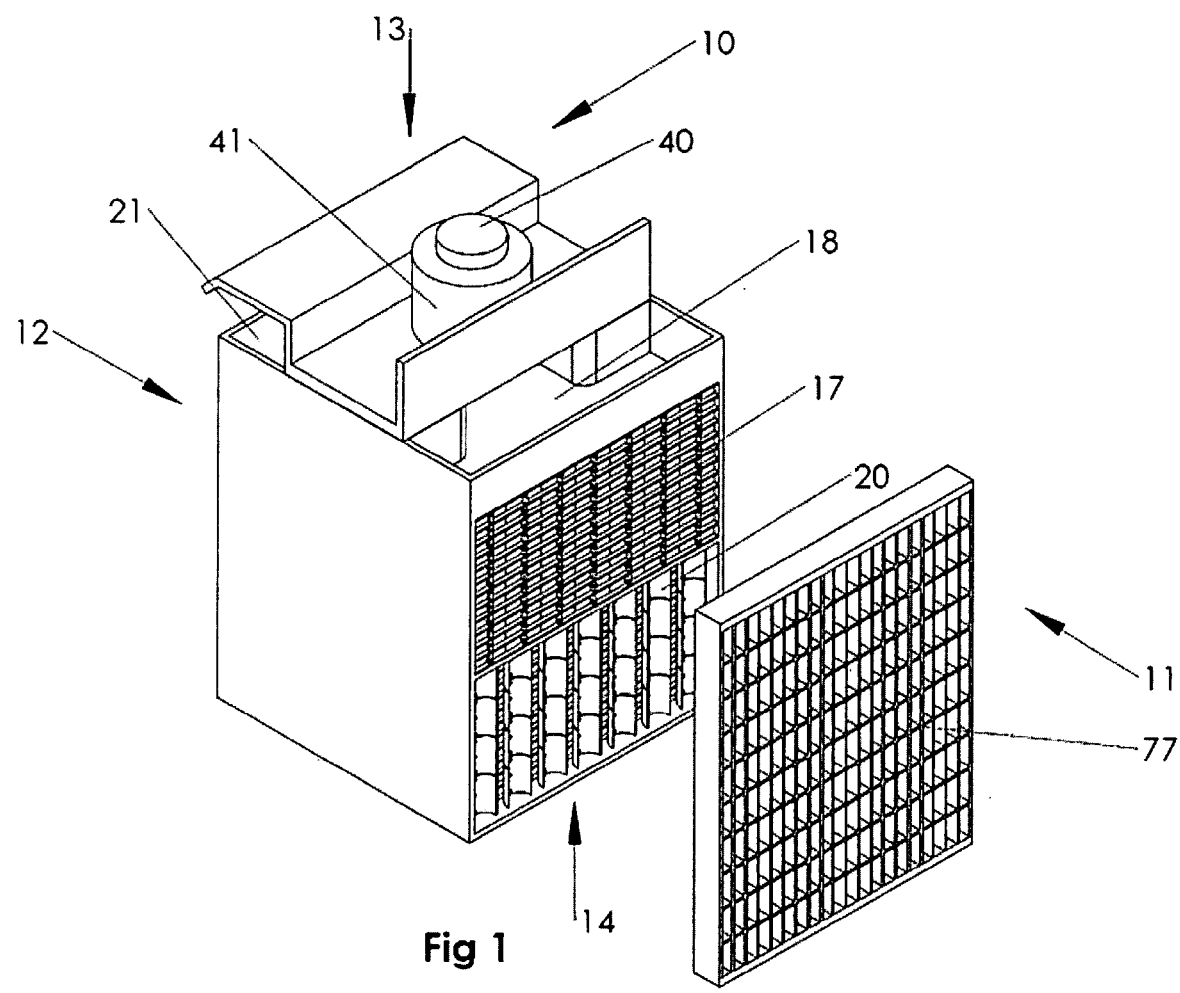
FIG. 1 is an isometric view of a device for converting energy of a wave of water into electricity in accordance with a preferred embodiment.

It should be understood that the appended drawings are not necessarily to scale, presenting a somewhat simplified representation of various preferred features illustrative of the basic principles of the invention. The specific design features of the device for conversion of energy of a wave of water as disclosed here, including, for example, the specific dimensions of the inlet and outlet chambers, will be determined in part by the particular intended application and use environment. Certain features of the illustrated embodiments have been enlarged or distorted relative to others to help provide clear understanding. In particular, thin features may be thickened, for example, for clarity of illustration. All references to direction and position, unless otherwise indicated, refer to the orientation illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the device for conversion of energy of a wave of water into electricity disclosed here. The following detailed discussion of various alternative and preferred features and embodiments will illustrate the general principles of the invention with reference to a device suitable for use in conversion of energy of a wave of water. Other embodiments suitable for other applications will be apparent to those skilled in the art given the benefit of this disclosure.

Figure 2:
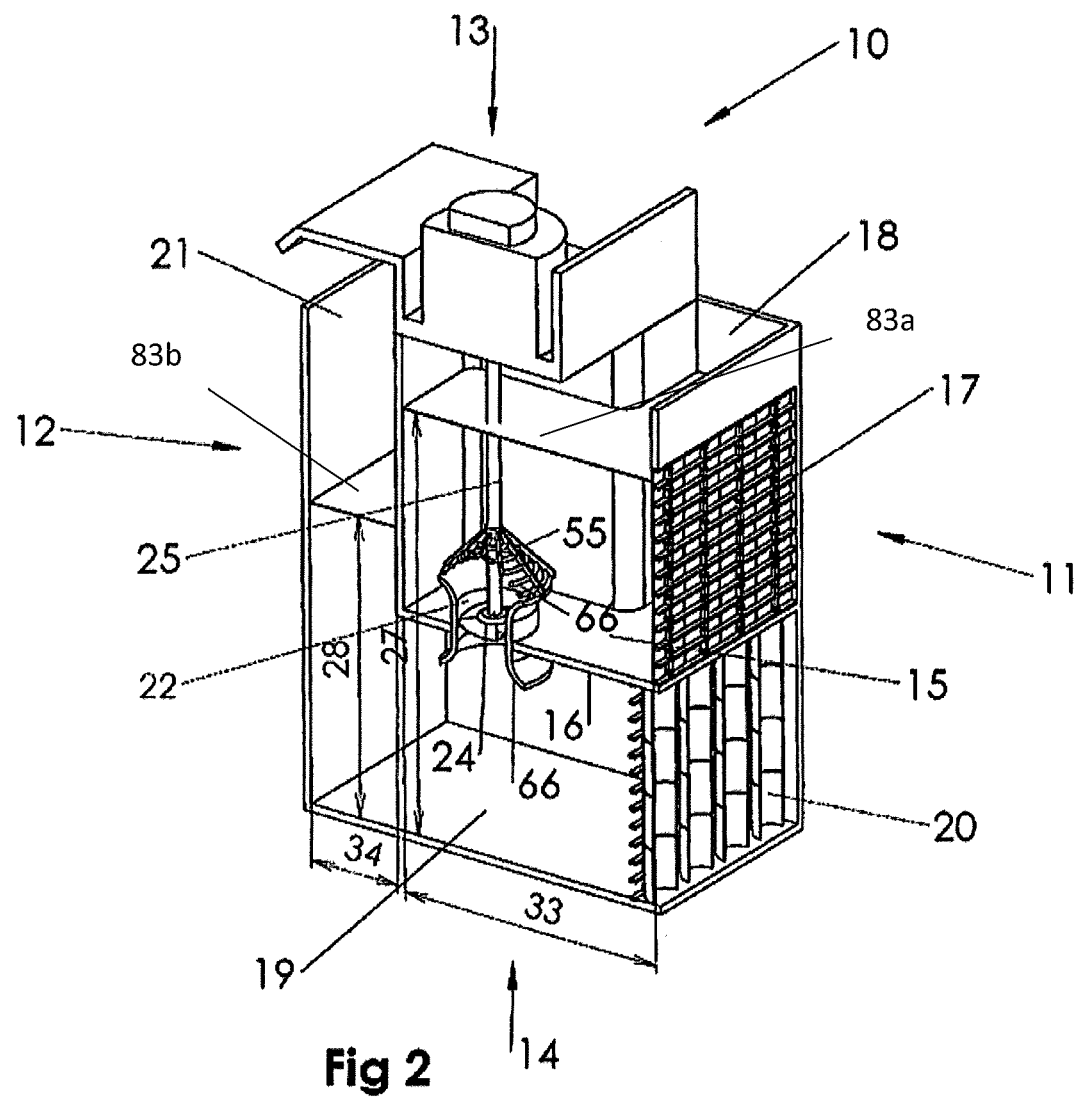
FIG. 2 is an isometric cut-away view of the embodiment of FIG. 1 showing the inside of the device with an inlet chamber and an outlet chamber partially filled by water from a wave.

Turning now to the drawings, FIG. 1 shows a device 10 for conversion of energy of a wave of water into electricity. The device can function as a wave energy absorber or a reactive wave damper such as a fixed or floating breakwater. Multiple units of the device 10 may be used together at the shore line or alternatively on a floating pontoon at sea. Water from a wave flows into an inlet chamber 15 above an outlet chamber 19. The outlet chamber 19 may have a substantially L-shaped cross-sectional view as shown in FIG. 2. The device has a front 11, a back 12 opposite the front, a top 13, and a bottom 14 opposite the top. From top to bottom defines a vertical direction which in normal operation also corresponds to the pull of gravity. Water from a wave flows into the inlet chamber, filling it to a water height 27. Advantageously energy of the wave is captured in the inlet chamber. From the inlet chamber 15, water flows to the outlet chamber 19, via a connecting duct 22, rotating a turbine 24 which is part of an electricity generator 41 to generate electricity. The inlet chamber 15 has an inlet chamber vent 18 which is positioned at the top 13 of the device 10 and a depth 33. The outlet chamber 19 has an outlet chamber vent 21 and an outlet depth 34.

The inlet chamber 15 has inlet valves 17 which allow the flow of water in one direction into the inlet chamber 15, yet advantageously resist flow of water out of the inlet chamber through those same valves. The outlet chamber 19 has outlet valves 20 which allow the flow of water in one direction out of the outlet chamber 19, yet advantageously resist flow of water into the outlet chamber through those same valves. Inlet valves 17 and outlet valves 20 are preferably located at the front 11 of the device 10. This is so that the valves 17 and 20 face incident waves in normal operation. Advantageously, the inlet valves 17 are located above the outlet valves 20 to keep the outlet valves 20 submerged in the water during normal operation. When a water level of a large wave is lower than the upper edge of the outlet valves 20, such as during the trough of the wave at storm conditions, the outlet valves 20 will still allow the flow of water in one direction out of the outlet chamber 19. It is not necessary for the outlet valves 20 to be submerged in water for flow to occur out of the outlet chamber.

The inlet valve 17 may be positioned anywhere between the top 13 and the partition 16. Thus, the inlet valve 17 may be at the top 13, between the top 13 and the partition 16, or at the partition 16. The outlet valve 20 may be positioned anywhere between the partition 16 and the bottom 14. Thus the outlet valve 20 may be at the partition 16, between the partition 16 and the bottom 14, or at the bottom 14.

Figure 11:
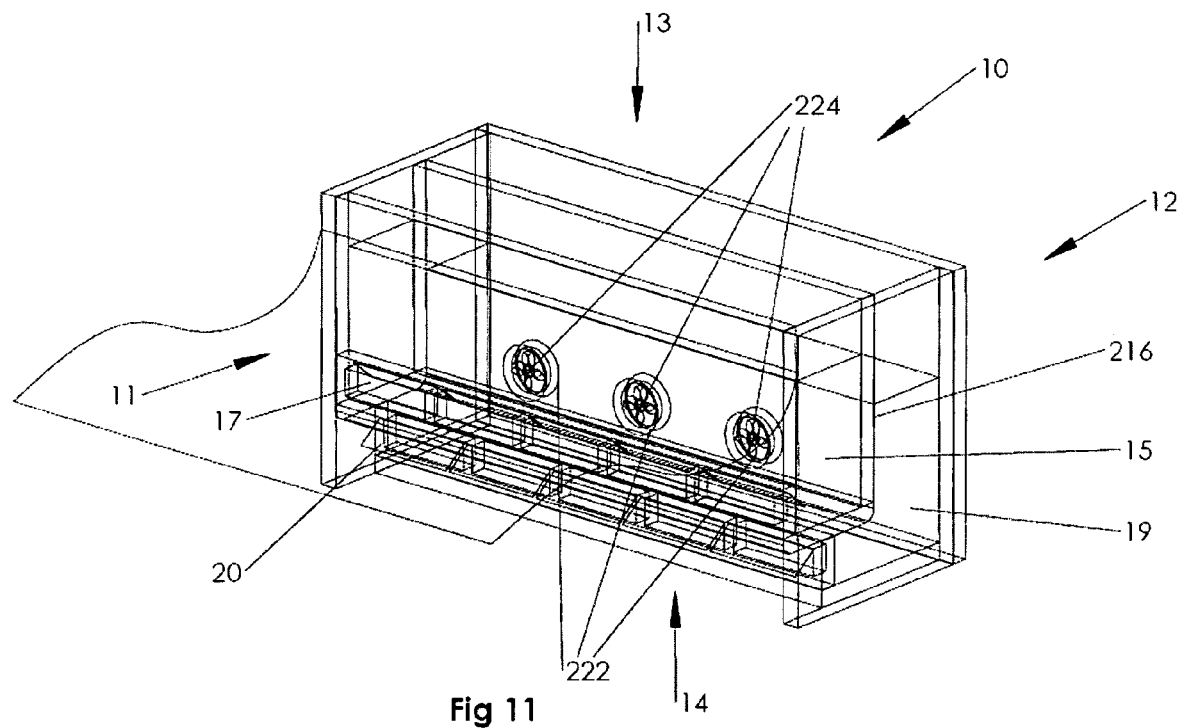
FIG. 11 is another preferred embodiment of the device for converting energy of a wave of water into electricity.

The inlet chamber 15 and the outlet chamber 19 are separated partially by a partition 16. The partition 16 may have a portion substantially parallel to the bottom 14 of the device 10, where the one or more turbines are located as shown in FIG. 2. Alternatively, the partition 216 may have a portion substantially perpendicular to the bottom 14 of the device where the one or more turbines are located as shown in FIG. 11. The bottom 14 of the device 10 is also the bottom 14 of the outlet chamber 19.

There is a connecting duct 22 at the partition 16 connecting the inlet chamber 15 to the outlet chamber 19. More than one connecting duct may be used in the device. The connecting duct optionally may be positioned below the water line (i.e., underwater). The connecting duct may assume a variety of shapes such as straight, bent, or U-shaped depending on the layout of the chamber in the device. The connecting duct 22 allows the flow the water from the inlet chamber 15 to the outlet chamber 19. The connecting duct 22 may have chamfered ends 66 connecting the connecting duct 22 to the inlet chamber 15 and the outlet chamber 19. The connecting duct preferably has a cross sectional area which is less than a cross sectional area of the inlet chamber, thereby increasing velocity of water flowing through the duct. The cross sectional area of the inlet chamber is defined by the surface area of the liquid in the inlet chamber. The cross sectional area of the connecting duct is defined by the area formed by a section line through the connecting duct at the partition. Depending on the configuration of the device 10, the device 10 may have more than one connecting duct 22 between the inlet chamber and the outlet chamber.

The generator 41 comprises turbine 24 and may also comprise a mechanical initial disk and/or capacitors so that electricity produced by rotation of the turbine in response to the flow of water through the connecting duct is more stable and consistent. As shown in the Figs., the electricity generator 41 may be partially located outside the chambers 15, 19 and connected via shaft 25 to turbine 24. Turbine 24 is positioned in the connecting duct 22. The turbine 24 has an axis of rotation which is substantially in the vertical direction. Rotation of the turbine generates electricity. Optionally a filter 55 may also be provided in the device. The filter 55 may be positioned in the connecting duct 22 or above the connecting duct 22. The filter 55 filters the water flowing into the connecting duct 22.

When an incident water wave hits the device 10 at the front 11, water enters the inlet chamber 15 via the inlet valve 17. Little or no water will enter the outlet chamber 19 through the outlet valves 20 because the outlet valves 20 only allow flow of water in one direction out of the outlet chamber 19. The energy of the wave urges the flow of water into the inlet chamber. In effect, the energy of the wave is advantageously trapped in the inlet chamber by the inlet valves. This additional water creates a pressure differential between the inlet chamber and the outlet chamber, and water flows the only way it can, through the connecting duct 24. This causes the turbine 24 to rotate. The rotation of the turbine 24 will then convert the energy from the water wave to electricity via the electricity generator 41. Advantageously, in normal operation the flow of water is in the direction of the pull of gravity, so gravity cooperates with water pressure to help increase generation of electricity. After flowing into the outlet chamber, the water will then flow out of the outlet chamber 19 via the outlet valve 20. Most of the flow will occur when water pressure outside the outlet chamber 19 is less than water pressure inside the outlet chamber 19.

The inlet chamber 15 has an inlet chamber vent 18 which is positioned at the top 13 of the device 10. The top 13 of the device 10 is also preferably the top of the inlet chamber 15. The inlet chamber vent 18 allows excess water to flow into and out from the inlet chamber 15. The inlet chamber vent 18 also allows air to flow freely into and out of the inlet chamber 15 so as to maintain atmospheric air pressure in the inlet chamber 15.

Figure 7:
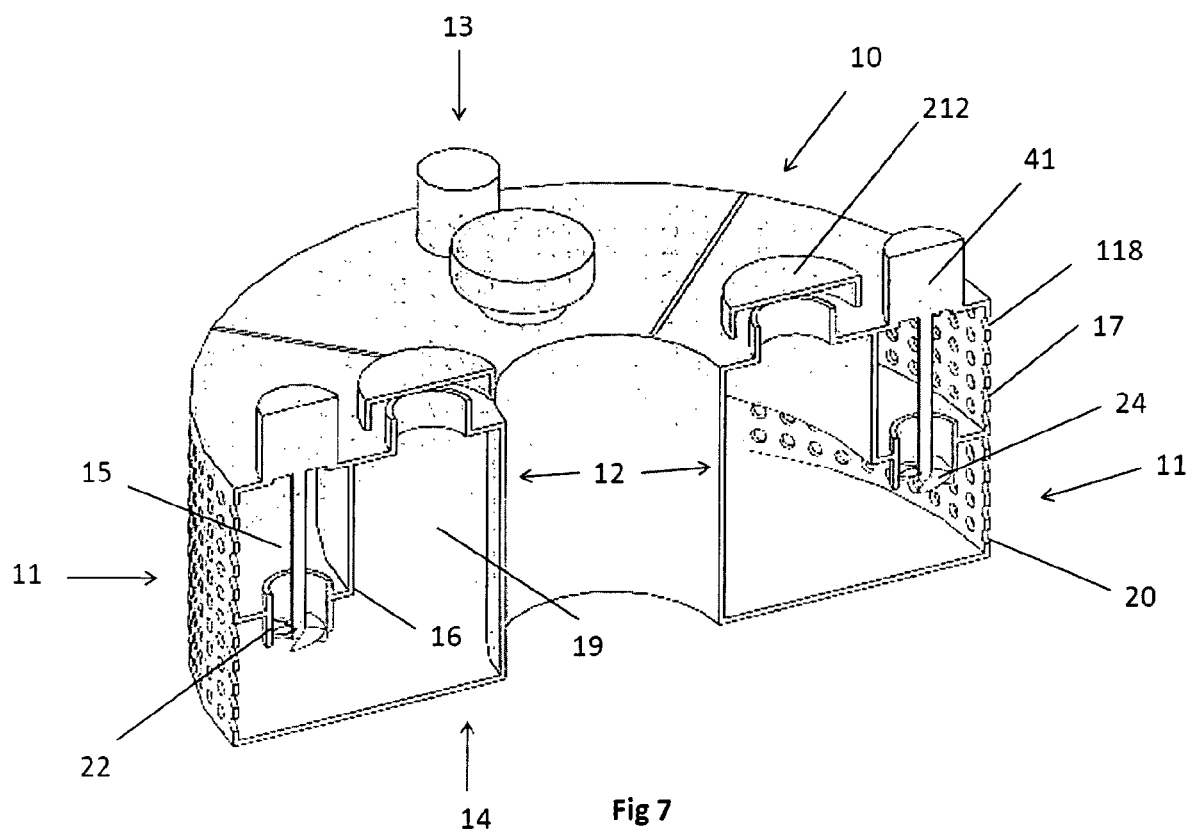
FIG. 7 is an isometric cut-away view of an alternate preferred embodiment of the device for converting energy of a wave of water into electricity having a front with a curved surface.
Figure 8:
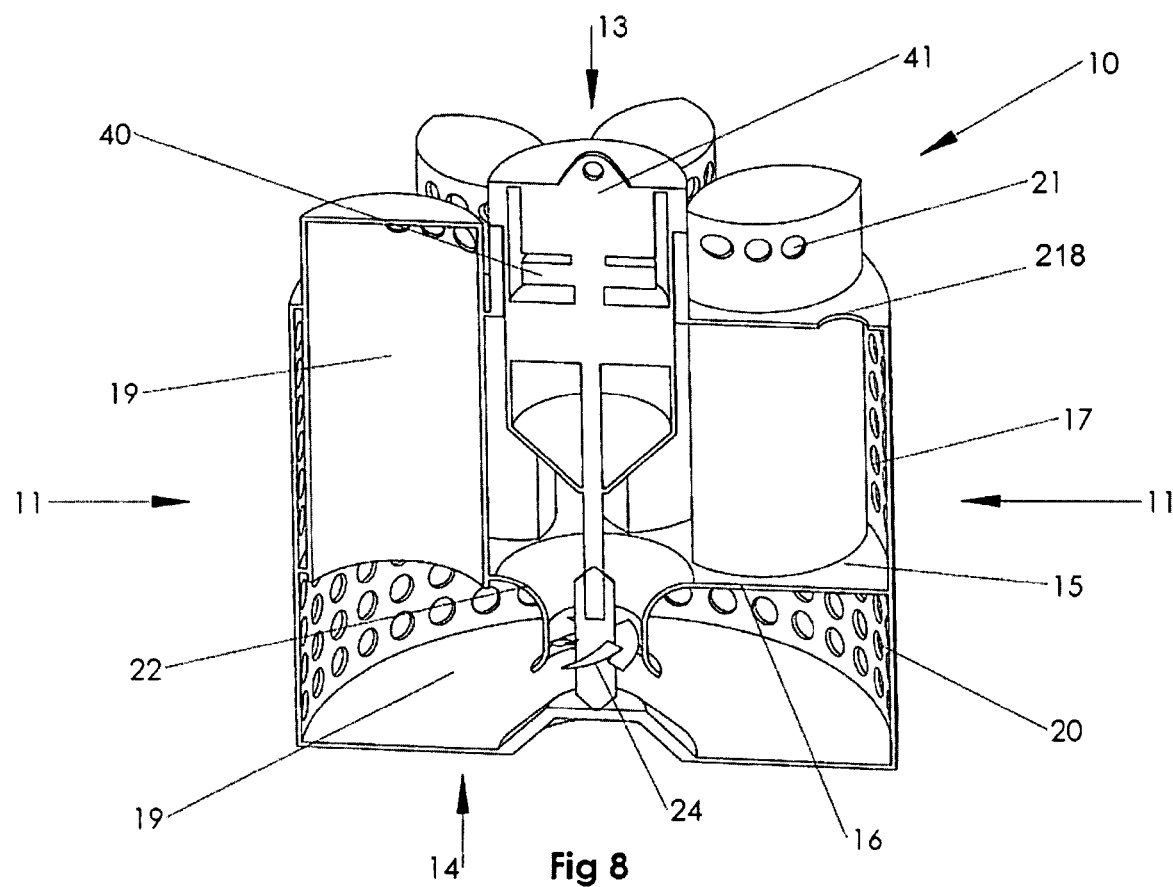
FIG. 8 is an isometric cut-away view of another alternative preferred embodiment of the device for converting energy of a wave of water into electricity.

In accordance with a highly advantageous feature, the outlet chamber 19 has an outlet chamber vent 21 which is positioned between the partition 16 and the top 13. In the preferred embodiments shown in the Figs., the outlet chamber vent 21 is positioned generally adjacent to or at the top 13 as shown in FIGS. 7, 8 and 11 or at the top and back 12 as shown in FIG.

2. The outlet chamber vent 21 acts in a similar way as the inlet chamber vent 18. The outlet chamber vent 21 allows excess water to flow into and out from the outlet chamber 19. The outlet chamber vent 21 also allows air to flow freely into and out of the inlet chamber 15 so as to maintain atmospheric air pressure in the inlet chamber 15. This is highly advantageous in comparison to a closed outlet chamber, where additional flow of water into the outlet chamber without a place for the air to escape to would increase pressure resisting flow of the water through the connecting duct, slowing water speed and thereby decreasing the efficiency of the device. The outlet chamber vent 21 is preferably positioned at the back 12 and/or top 13 of the device 10 so as to reduce or prevent the flow of excess water from incident waves into the outlet chamber such as could be the case in extreme high seas or stormy weather where the waves hitting the device contain much more energy than average. The inlet chamber vent 18 and the outlet chamber vent 21 also aid in the endurance of the device 10 in high seas by allowing for rapid egress of water after a large wave hits the device.

Grid plates 77 optionally may be fitted at the front 11 before the inlet valves 17 and the outlet valves 20 to prevent foreign objects or marine lives to enter the inlet chambers 15 and the outlet chambers 19.

Water surface waves or sea waves carry both potential and kinetic energy. When the wave hits a rigid surface perpendicular to the wave principle propagation direction (e.g. rocks on shore or ship hull or pontoon hull), the wave amplitude doubles itself before transmitting its energy in form of reflective waves in the opposite direction. The device disclosed herein captures both kinetic and potential energy of such waves. The oscillating water heights in the inlet chamber and the outlet chamber work to absorb and release energy from the wave through the inlet and outlet valves. When functioning optimally, energy from reflective waves is at a minimum and the oscillation of the water between the columns reaches a resonance phenomena where the efficiency of the device is at a maximum level.

The device 10 uses the hydrostatic pressure difference or relative water height between inlet chamber 15 and outlet chamber 19 to receive water from wave during a crest (positive peak) phase into the inlet chamber 15 through the inlet valves 17. The water rushing into the inlet chamber 15 results in the inlet chamber water height 27 in the inlet chamber 15 to rise and capture energy of the water. During this phase, the outlet valves 20 are closed as the pressure from the outside exceeds the pressure from inside the outlet chamber. The outlet chamber water height 28 in the outlet chamber 19 will also rise because of the water intake through the connecting duct 22. Generally, when water height 27 exceeds water height 28, water will flow from the inlet chamber to the outlet chamber. During this process, the potential energy of the water inside the inlet chamber 15 gained from the incident wave is transformed into kinetic energy through the water flow inside the connecting duct 22. The cross sectional area of the connecting duct 22 is designed to be less than the cross sectional area of the inlet chamber 15. The cross sectional area of the connecting duct may be adjusted to account for the turbine size, the desired speed of the generator, and other factors. A narrow connecting duct concentrates the kinetic energy from the water flowing through and increases the velocity of the water producing more power.

When the incident wave turns from crest phase to trough phase (with negative peak), the water height difference between the water outside of the chambers 15, 19 and the water inside of the chambers 15, 19 becomes negative, i.e. the water height in the chambers 15, 19 is higher than the water height outside of the chamber. This will cause the outlet valves 20 to open and cause the inlet valves 17 to close. During this process, the water inside the outlet chamber 19 will flow out, resulting in decreased outlet chamber water height 28. Meanwhile, the inlet chamber water height 27 is high, because the inlet valves 17 are closed, However, the inlet chamber water height 27 decreases as the water flows through the connecting duct 22 and into the outlet chamber 19. The difference in the inlet chamber water height 27 and the outlet chamber water height 28 keeps the flow of water continuous.

Filters and/or turbine 24 consume part of the wave energy by introducing heat and water turbulence. Such filters may have a dampening effect, and can mitigate the effect of reflective waves. In some instances this can allow for high energy absorption efficiency over a greater range of wave periods. Also, to help reduce turbulence, preferably the generator is positioned outside a portion of the outlet chamber between the partition of the inlet chamber and the bottom. As shown in the Figs., the generator is positioned entirely outside the outlet chamber and only the shaft 25 is positioned in the inlet chamber 15.

A given location has an average wave energy, average wave length, average wave height and average wave period. In accordance with a highly advantageous feature, device 10 can be designed and optimized for a given wave height, wave length and wave period. That is, the depth 33 and outlet depth 34 may be varied depending on the given location; some parts of the world have waves with high average energy, other parts of the world have waves with lower average energy. The inlet chamber 15 may have a depth 33 approximately 20 to 50% of the average wave length of the incident wave. More preferably, the depth 33 is 25% to 33% of the average wave length of the incident wave. Wave length is defined as the distance between repeating units of a propagating wave of a given frequency and includes a crest and a trough. Further, the depth 33 of the inlet chamber 15 should preferably be equal to the outlet depth 34 of the outlet chamber 19.

Figure 9:
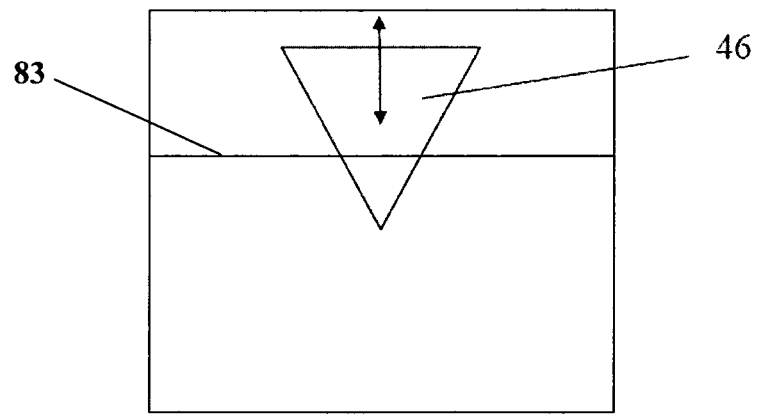
FIG. 9 is a cross-sectional view of a first embodiment of a chamber of the device with an adjustable water surface area.
Figure 10:
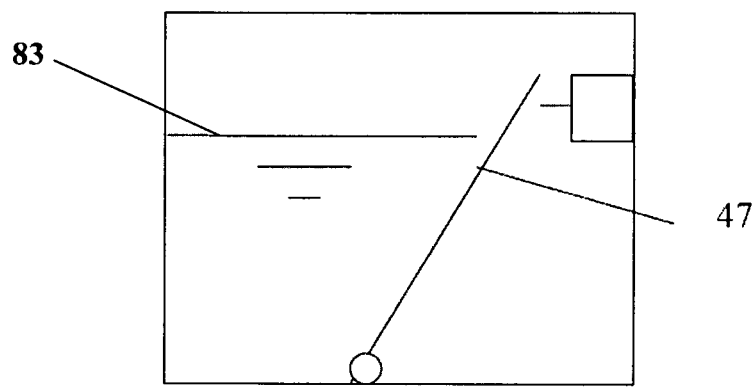
FIG. 10 is a schematic view of a chamber of the device with an adjustable water surface area.

The cross-sectional areas of both chambers 15, 19 are preferably kept the same. This helps to ensure relatively consistent flow through the chambers, which in turn helps produce more uniform electric power output. FIGS. 9-10 show schematics where a water surface area 83 of either the inlet chamber or the outlet chamber may be varied. Either the inlet water surface area 83a or the outlet water surface area 83b as shown in FIG. 2, or both is preferably adjustable by a wedge 46 or curved object insertable from air into water to vary the water surface area of the chamber (see FIG. 9). An alternative is a water-tight flap 47 which can be adjusted (see FIG. 10). The water surface area of the chambers may be automatically adjusted based on sensor feedback from the incident waves and in response to variations of wave energy.

Figure 3:
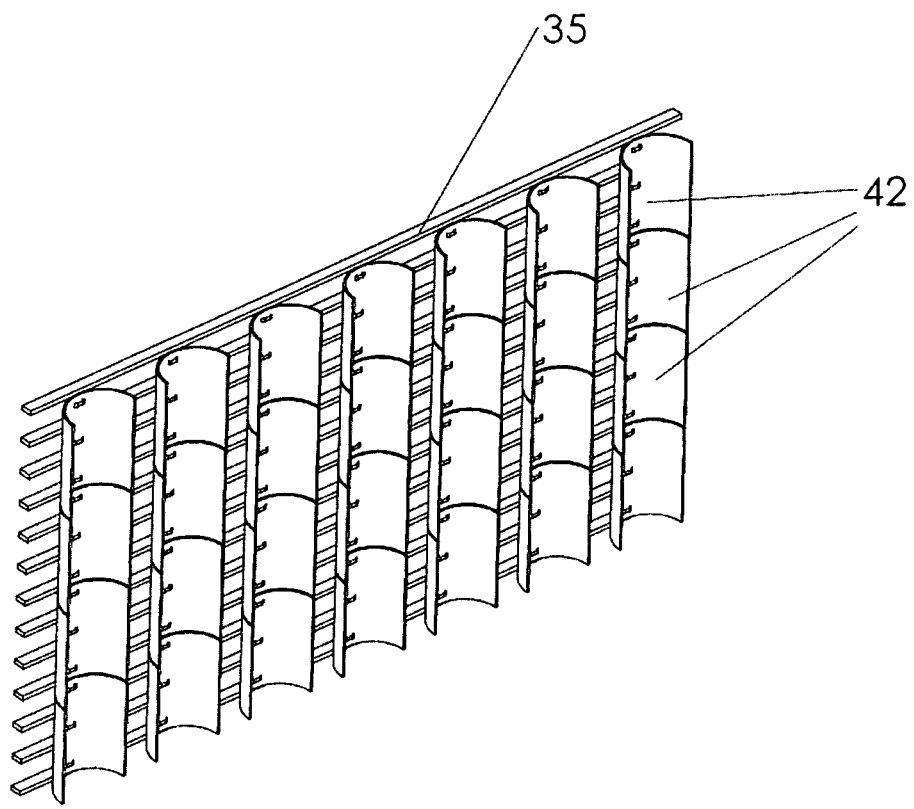
FIG. 3 is an isometric view of a preferred embodiment of one of either the inlet valves or the outlet valves when open.
Figure 4:
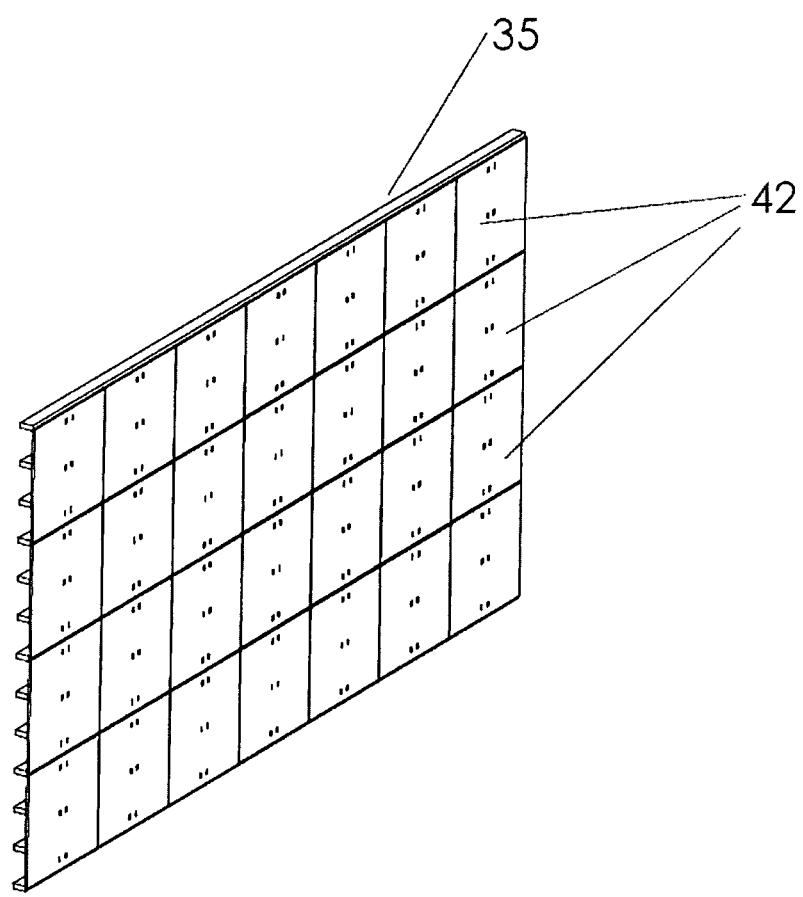
FIG. 4 is an isometric view of the valves in FIG. 3 when closed.

FIGS. 3 and 4 show a preferred embodiment of the inlet valves and outlet valves. The valves comprise a mesh panel 35 with a matrix of elastic membranes 42. The membranes have a first side and a second side. In response to water pressure on the first side, the membranes flex to allow water to flow through from the first side to the second side, and in response to water pressure on the second side, the membrane restricts the flow of water by abutting against the mesh panel, thereby acting as a one way valve. The mesh panels 35 may be made of metal, plastic or a composite material, etc. The elastic membranes 42 may be rectangular.

Figure 5:
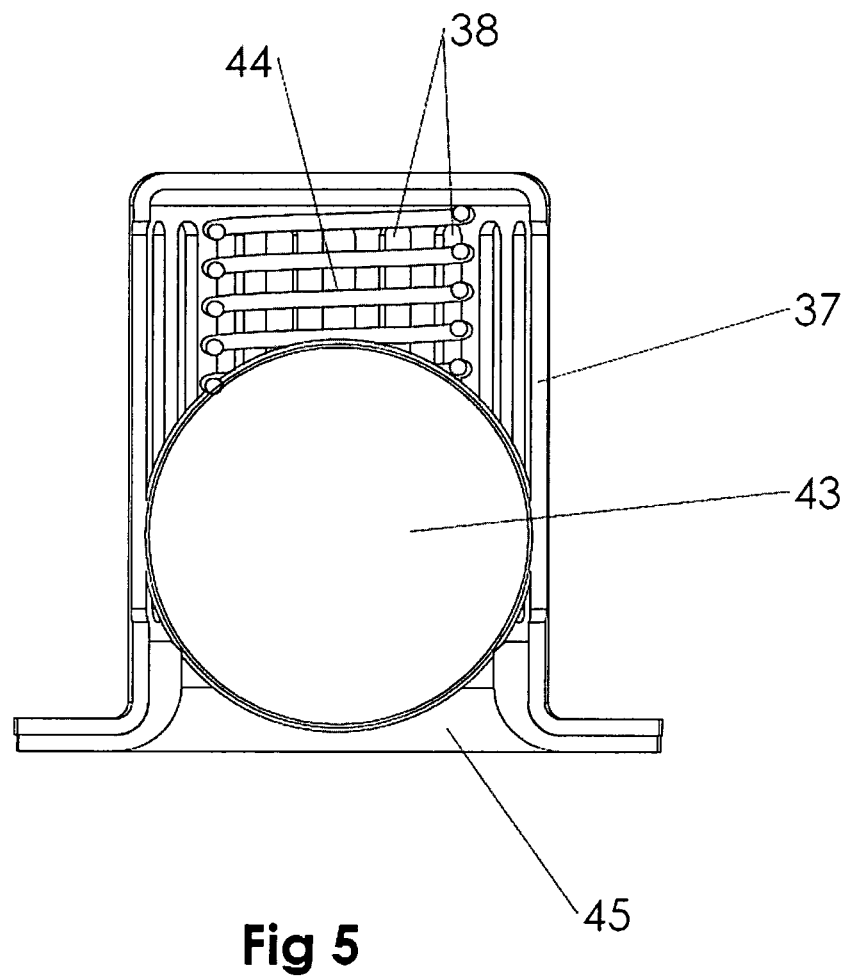
FIG. 5 is a cross-sectional view of another preferred embodiment of an inlet valve or an outlet valve shown closed.

FIG. 5 shows an alternate embodiment of the inlet and outlet valves. The valve comprises a cylindrical cup-shaped shell 37. The shell has a plurality of slit-like openings 38 along the circumference of the cup to allow the flow of water.

There is a ball 43 in the shell 37. A spring 44 pushes the ball 43 against the shell opening 45 of the shell 37 to effectively close the valve and there is no flow of water. When there is water pressure that is greater than the force of the spring 44 on the ball 43, the ball 43 is pushed away from the opening 45 and the valve opens to allow flow of water. The force of the spring 44 can be varied according to the pressure desired.

Figure 6:
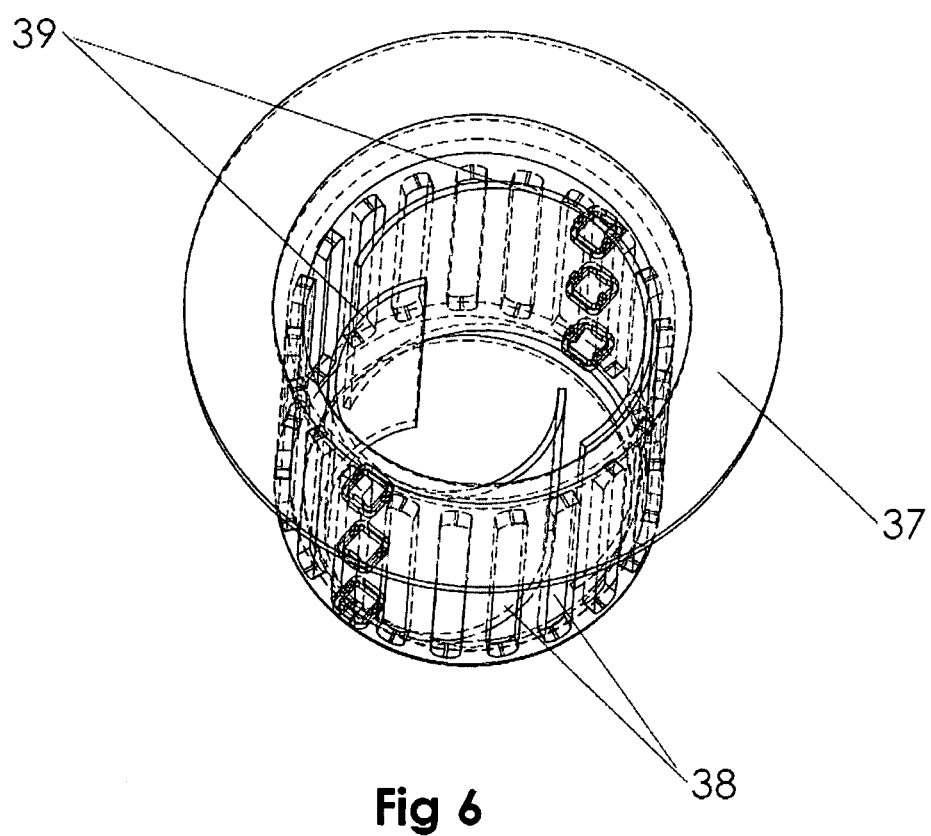
FIG. 6 is an isometric view of another preferred embodiment of an inlet valve or an outlet valve, shown open.

FIG. 6 shows another alternative embodiment of the valves. The valve also comprise a cup-shaped shell 37 having a generally cylindrical cross-section. The shell has a plurality of slit-like openings 38 along the circumference of the cup to allow the flow of water. One or more leaves 39 are positioned inside the shell 37 in a substantially circumferential manner. When there is water pressure on the leaf from the leaf toward the shell the leaf 39 is urged against the openings 38, which in turn closes the openings and restricts the flow of water. When the pressure is removed from the leaf 39, the leaf moves away from the openings, allowing flow of water through the openings 38 from an outside of the shell to the inside of the shell. A second leaf 39 may also be positioned within the shell, with each leaf having a hemi-cylindrical cross section. Other suitable valves will be readily apparent to those skilled in the art given the benefit of this disclosure.

The various embodiments of the valves may be used alone or in combination. Preferably both the inlet valves and outlet valves are one-way in that they preferentially allow flow of water in one direction. Most preferably, both the inlet valves and the outlet valves are positioned on the front and aligned to allow flow in opposite directions. The number of valves to use may be varied depending on the surface area of the front plane of the device. Generally, the more the number of valves used, the greater the flow of water since the valves may open and close independently to allow flow of water. Further, the cross-sectional area of the inlet valves 17 and outlet valves 20 facing the incident wave should preferably be similar. The size of the openings of the valves is related to the quantity of the valves and to be determined by cost-effectiveness and designed to maximize the total flow rate. In general, the larger the valve opening, the greater the flow of water due to less resistance. The valves should also be responsive and not too big that it is unable to close completely in time to prevent flow of water, for example when the difference in water heights are fluctuating very fast in short wave lengths.

FIG. 7 and FIG. 8 show alternative embodiments of the device 10 where the device has a curved surface at the front 11 and at the back 12. In particular, the front and back are generally cylindrical. These are preferably used in areas in the sea where the waves are coming in all directions.

The alternate embodiment of the device in FIG. 7 is substantially cylindrical and doughnut-shaped. The device in FIG. 7 has a front 11 with a curved front surface, here, a complete cylindrical surface. The device in FIG. 7 has a back 12 opposite the front with a curved back surface. The curved back surface is substantially concentric to the curved front surface. In normal operation, power generation is accomplished in a manner substantially similar to the embodiment of the device shown in FIGS. 1-2. As shown in FIG. 7, the inlet valves 17 and the outlet valves 20 are on the front 11 of the device. There are also provided inlet chamber vents 118 and outlet chamber vents 21 near or at the top of the device. The outlet chamber vents 21 may also preferably have a cap-like structure 212 above it to reduce or prevent the flow of excess water from incident waves into the outlet chamber.

FIG. 8 shows another alternate embodiment where, as in FIG. 7, the device is substantially cylindrical. However, here a series of inlet chambers 15 and outlet chambers 19 are positioned circumferentially around the device. As shown in FIG. 8, the inlet valves 17 and the outlet valves 20 are on the front 11 of the device. There are also provided inlet chamber vents 218 and outlet chamber vents 21 near or at the top of the device.

FIG. 11 shows another alternative embodiment of the device for converting wave energy to electricity. The device in FIG. 11 operates in a similar manner to the other embodiments. In this embodiment, a portion of the partition 216 is substantially perpendicular to the vertical direction as shown in the drawings. The connecting ducts 222 at the partition 216 connect the inlet chamber 15 to the outlet chamber 19. The turbines 224 are positioned in the connecting ducts 222. The turbines 224 each have an axis of rotation which is substantially perpendicular to the vertical direction.

The device 10 has a simple structure with limited number of moving parts (i.e. the valves and the turbine only). The housing of the chambers 15, 19 can be made of steel or reinforced concrete or composite material. The valves 17, 20 can be fitted on a detachable panel which can be installed and removed vertically for easy maintenance. The cost of fabrication will be low. The turbine 24, electricity generator 41 and inertial disk 40 may be integrated into a modular system, which can be inserted entirely into the inlet chamber 15 from the top 13 and removed entirely and vertically for maintenance when necessary.

Figure 12:
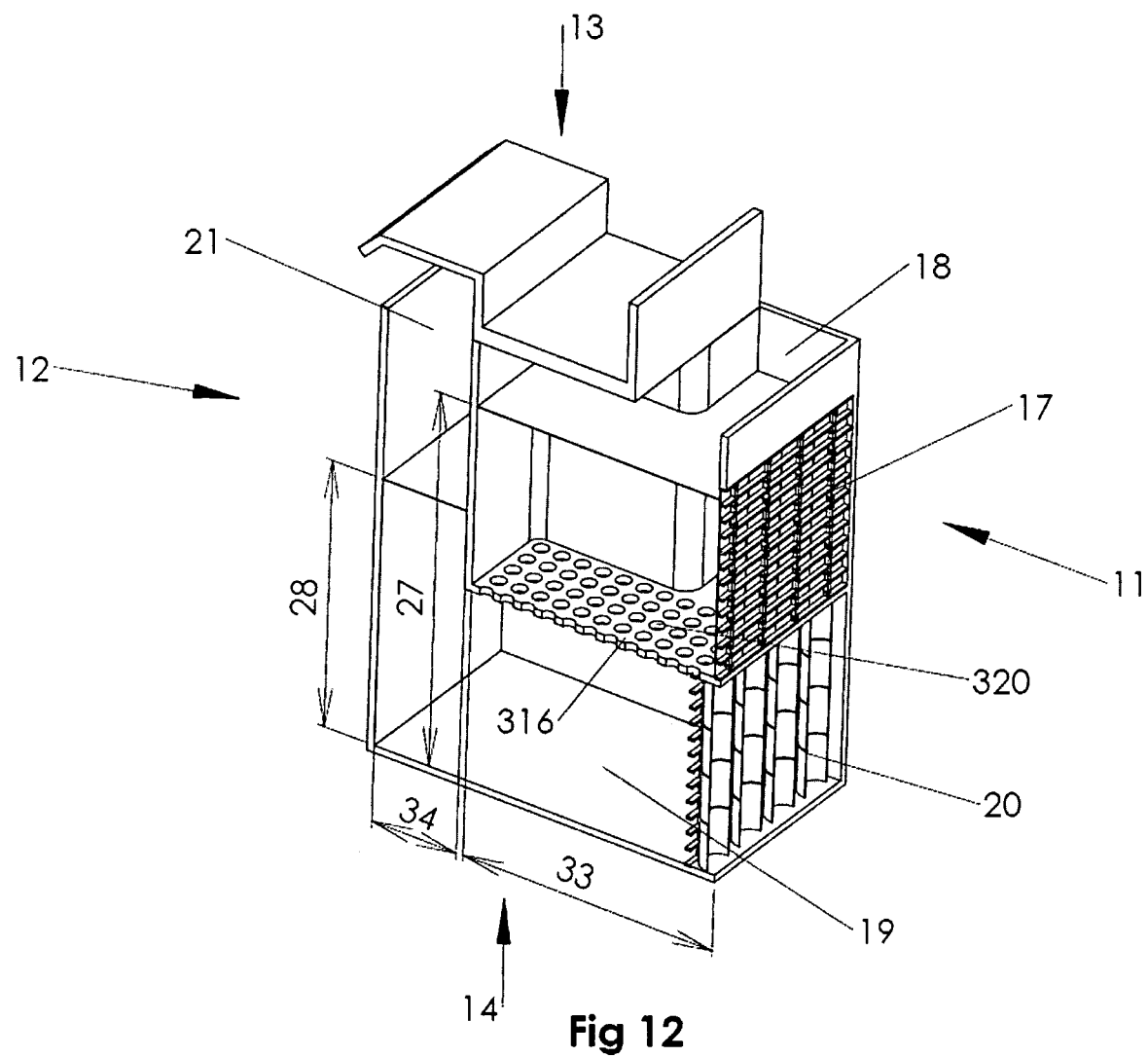
FIG. 12 and FIG. 13 are additional embodiments of devices showing absorption of wave energy.
Figure 13:
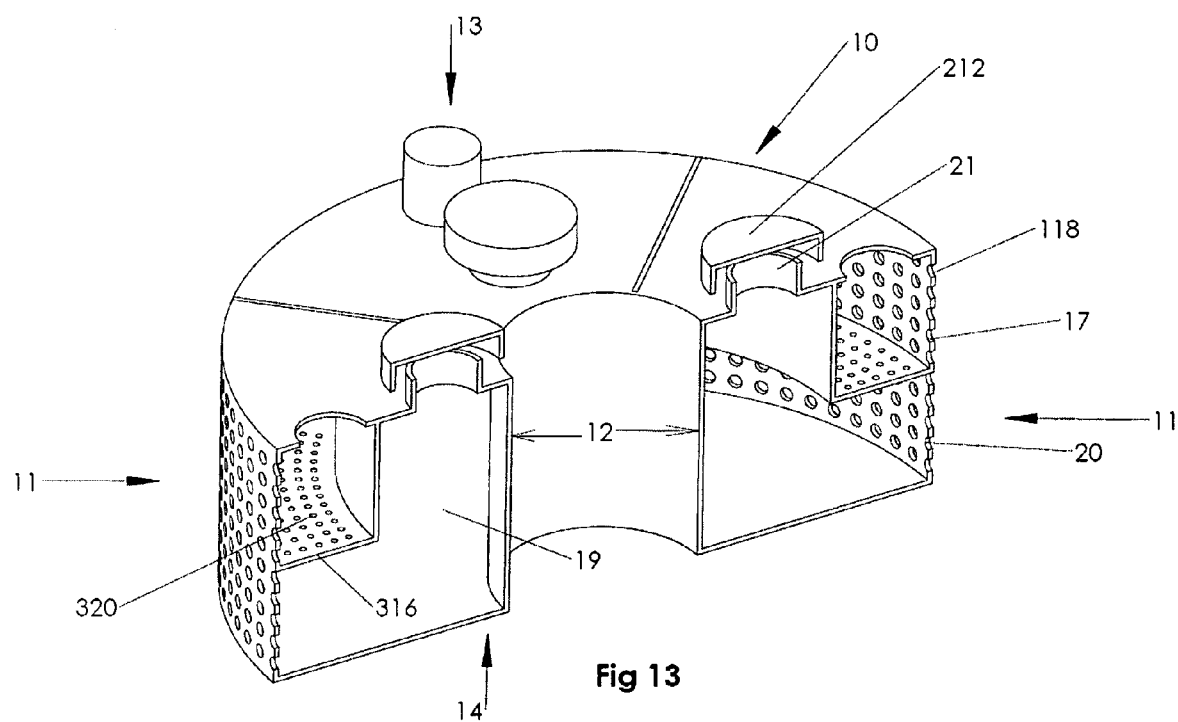

FIGS. 12 and 13 show wave energy absorption devices in accordance with additional embodiments. Generator(s), turbine(s) and connecting ducts are removed. Partition 316 between the inlet chamber and the outlet chamber is provided with a plurality of openings 320. Perforating the partition helps dampen the energy of the wave which reaches the inlet chamber, and thereby absorb at least part of the energy of the wave. Filters in the inlet chamber similar to those described above may also be used.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A device for conversion of energy of waves of water, the device comprising:
   a front and a back opposite the front, a top and a bottom opposite the top, the front and back extending from a first side to a second side of the device;
   an inlet chamber having a partition;
   at least one inlet valve at the front between the top and the partition, the at least one inlet valve fully extending from the first side to the second side across the front of the device, and an inlet chamber vent, wherein the at least one inlet valve allows flow of water in one direction into the inlet chamber;
   an outlet chamber having at least one outlet valve between the partition and the bottom, the at least one outlet valve fully extending from the first side to the second side across the front of the device, the at least one outlet valve being disposed vertically below the at least one inlet valve, and an outlet chamber vent positioned at one of the top and the back, adapted to maintain atmospheric pressure of air in the outlet chamber, wherein the at least one outlet valve allows flow of water in one direction out of the outlet chamber;

wherein the inlet chamber is located directly above and vertically aligned with the outlet chamber;

a connecting duct connecting the inlet chamber to the outlet chamber, the connecting duct extending vertically through the partition from a first end to a second end thereof, the first end being disposed inside the inlet chamber, and the second end being disposed inside the outlet chamber; and a generator assembly including a generator and a turbine operatively connected with each other, the turbine being positioned at least partially in the connecting duct, the generator being configured to generate electricity in response to wave energy-induced flow of water into the inlet chamber.

2. The device of claim 1, wherein the turbine is positioned outside a portion of the outlet chamber between the partition of the inlet chamber and the bottom.

3. The device of claim 1, wherein a top to bottom direction defines a vertical direction, and the turbine has an axis of rotation in the vertical direction.

4. The device of claim 1, wherein the connecting duct has chamfered ends connecting the duct to the inlet chamber and to the outlet chamber.

5. The device of claim 1, further comprising a filter which filters water flowing into the connecting duct.

6. The device of claim 1, wherein the waves of water further comprise an average wave energy at a give location, wherein the average wave energy of the waves of water forces water through the at least one inlet valve and into the inlet chamber, filling the inlet chamber to a water height which is between the partition and the inlet chamber vent.

7. The device of claim 6, wherein the inlet chamber has an inlet water surface area, the outlet chamber has an outlet water surface area, and the water surface areas are adjustable in response to variations from the average wave energy.

8. The device of claim 1, wherein a cross-sectional area of the connecting duct is smaller than a cross-sectional area of the inlet chamber.

9. The device of claim 1, wherein the waves of water further comprise an average wave length at a given location, wherein the inlet chamber has a depth which is about 20 to 50% of the average wave length.

10. The device of claim 1, wherein the inlet chamber has an inlet depth, the outlet chamber has an outlet depth, and the inlet depth is generally equal to the outlet depth.

11. The device of claim 1, wherein the at least one inlet valve and the at least one outlet valve each comprises a mesh panel and a membrane having a first side and a second side, wherein in response to water pressure on the first side, the membrane flexes to allow water to flow through from the first side to the second side, and in response to water pressure on the second side, the membrane engages the mesh panel to restrict the flow of water.

12. The device of claim 1, wherein the at least one inlet valve and the at least one outlet valve each comprises a shell having a plurality of openings and a first leaf, wherein high pressure water against the leaf urges the leaf against the openings, which in turn closes the openings and restricts flow of water, and when the pressure is removed from the leaf, the leaf moves away from the openings, allowing flow of water through the openings.

13. The device of claim 12, wherein each valve of the at least one inlet valve and the at least one outlet valve further comprises a second leaf, wherein each shell has a generally cylindrical cross section, each first and second leaf has a hemi-cylindrical cross section blocking water flow through a portion of the openings when high pressure water is introduced to the leaves.

14. The device of claim 1, wherein the inlet chamber vent extends from the first side to the second side across the front of the device.

15. The device of claim 14, wherein the outlet chamber vent extends from the first side to the second side across the back of the device.

* * * * *